United States Patent [19]

Hamm

[11] 4,331,723
[45] May 25, 1982

[54] ADVANCED COMPOSITE

[75] Inventor: Robert A. Hamm, Bellevue, Wash.

[73] Assignee: The Boeing Company, Seattle, Wash.

[21] Appl. No.: 204,128

[22] Filed: Nov. 5, 1980

[51] Int. Cl.³ .............................. B32B 5/02; B32B 5/28
[52] U.S. Cl. ..................................... 428/61; 52/309.16;
156/93; 156/293; 428/102; 428/113; 428/174;
428/295; 428/902
[58] Field of Search ................ 428/61, 113, 102, 174,
428/295, 286, 902; 156/93, 293; 52/309.16

[56] References Cited
U.S. PATENT DOCUMENTS

| 4,109,435 | 8/1978 | Lloyd | 428/408 |
| 4,113,910 | 9/1978 | Lloyd | 428/119 |
| 4,256,790 | 3/1981 | Lackman | 428/116 |

Primary Examiner—Paul J. Thibodeau
Attorney, Agent, or Firm—Morris A. Case; Bernard A. Donahue

[57] ABSTRACT

A composite structure has joints reinforced with adherend inserts between skin and web. The inserts are wedge shaped, have laminated sides with reinforcement in two directions, a reinforced core and the laminates are stitched together adjacent the core.

8 Claims, 4 Drawing Figures

PULL OFF TENSION DISTRIBUTION

ADVANCED COMPOSITE

BACKGROUND OF THE INVENTION

The use of composite structures has been steadily growing, particularly in those industries such as the aircraft industry where high strength, lightweight structures are especially desirable. Joints in these composite structures, such as between a panel or skin and a spar or rib are often subject to heavy tension stresses and can become a limiting factor in the composite structure. Various means have been used to strengthen these joints with varying degrees of success. It has been found that an especially effective joint can be prepared using an insert as practiced by this invention.

SUMMARY OF THE INVENTION

A wedge shaped composite insert has a laminate along each of the three sides, a reinforced core between the laminates, and high strength stitching joining the laminates together adjacent the core. The insert is adherend between a panel and a spar or web and in combination with a joined sparor or web makes up a high strength joint for a comopsite structure.

It is an object of this invention to provide a high strength joint for a composite structure.

It is another object of this invention to provide a joint that effectively distributes tension stress between bonded sub structure to cover joints.

DETAILED DESCRIPTION

Figure 1:
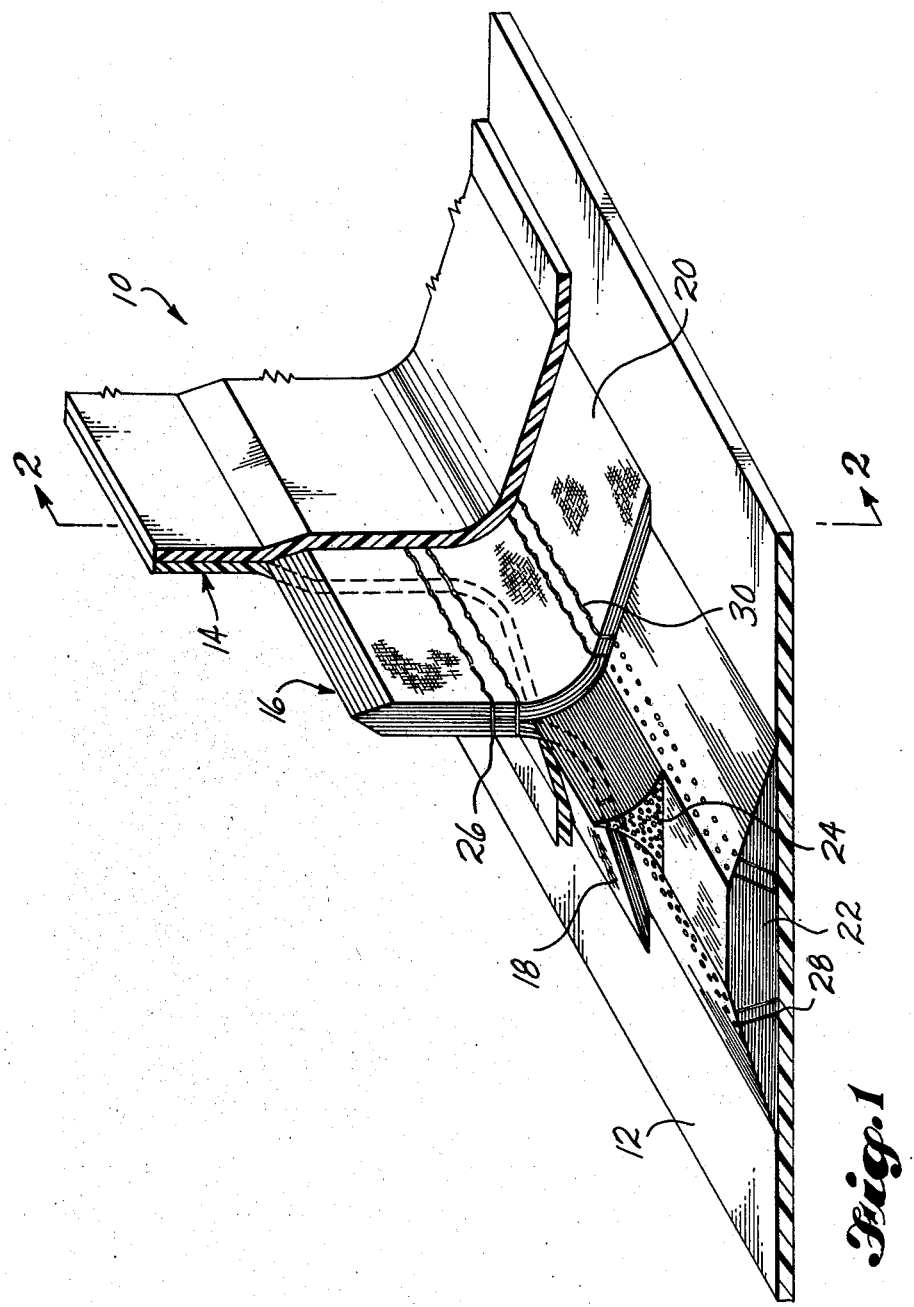
FIG. 1 shows a cut away perspective view of the composite structural joint of this invention.

A composite structural joint 10 is made up of a panel or skin 12 of reinforced plastic joined to a spar or web 14 or reinforced plastic, and a reinforced plastic insert 16 between the panel and spar distributes tensile forces to provide a high strength joint. The insert is wedge shaped and two of its sides are arcuate. The insert may be prepared from any of the known reinforcement materials such as glass, graphite, Kevlar, etc., and with any of the known resins such as epoxy or polyamide, etc. However, materials are usually selected from the same type of materials used for the panel or spars that are being reinforced with a graphite epoxy preferred.

The insert has a laminate of graphite reinforced epoxy resin along each of the three sides 18, 20 and 22. In these laminates, the graphite fibers preferably extend longitudinally and also extend normal to the longitudinal direction with the fibers following the contour of the respective side. A core 24 located between the layers of laminate has longitudinally extending graphite fibers in an epoxy resin. Adjacent the core, laminates 18 and 20 are stitched together at 26. Laminates 18 and 22 are stitched together at 28, and laminates 20 and 22 are stitched together at 30. This stitching is preferably threaded with Kevlar. Kevlar is a trademark of the DuPont Company and refers to a composition consisting of an aramid. The laminates, core and stitching make up the insert 16, which in turn is adherend between the panel 12 and spar 14 to make up the structural joint 10.

Figure 3:
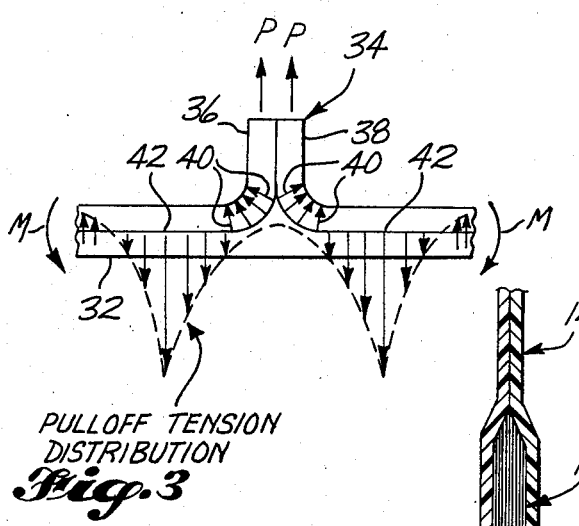
FIG. 3 shows the tension distribution in a normal composite joint between a panel and a web.
Figure 2:
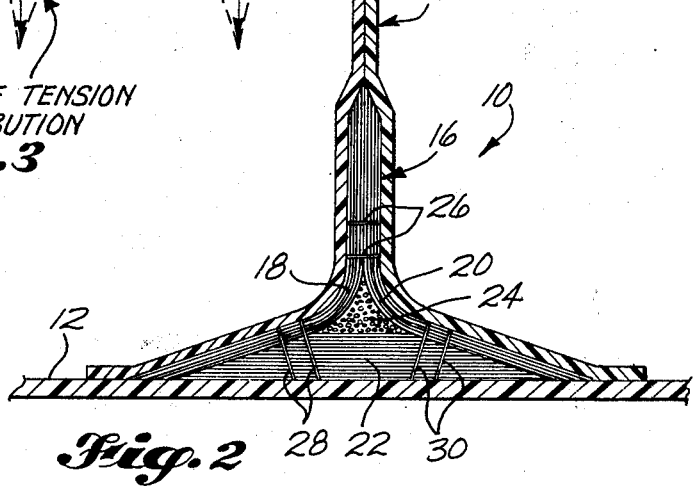
FIG. 2 shows a sectional view taken along 2—2 of FIG. 1.

FIG. 3 shows a typical pull off distribution for a joint on a composite structure of graphite reinforced epoxy resin where a skin 32 is joined to a web 34, which in this figure is made up of two graphite epoxy laminates 36 and 38, which laminates are turned on a short radius. The web is joined to the skin with epoxy resin. The failure mode for this type of part is a principal tensile stress in the epoxy resin at the radius 40 and/or along the skin web interface 42. The radial tension stress is reduced in inverse proportion to the radius and therefore a small radius means there is a possibility of pull off failure at that radius. The tensile loads along the skin web also makes for a weakened area where the pull off tension is high and could cause failure.

Figure 4:
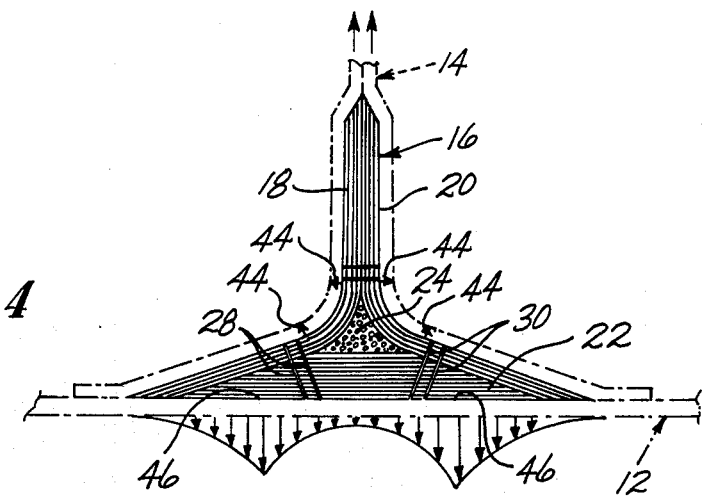
FIG. 4 shows the tension distribution in the composite joint of this invention.

FIG. 4 shows the pull off distribution for composite structural joint 10 using the insert 16 of this invention. The insert not only has an enlarged radius 44 to greatly increase the ability to resist pull off forces at that radius, but it changes the pull off tension distribution at the interface 46 between the skin and the web. The insert combines with the skin and web to form a composite joint that redistributes the tension stress and also provides stiffness to the joint to assist in carrying bending loads, which additionally assists in increasing resistance to the tension stresses.

To build the insert, laminate 18 and 20 are laid up in a tool using 0°/90° graphite fibers in an epoxy resin. The core 24 is placed between the laminates with 0° longitudinally aligned graphite fibers in epoxy resin. The laminate 22 is then laid up with 0°/90° graphite fibers in epoxy resin, the resin advanced to the "B" stage, and the insert is stitched at 26, 28 and 30 with Kevlar thread. The insert is placed between the skin and web where it is cocured as an integral joint or it is cured and adhesively bonded to the skin and web.

I claim:

1. A composite structural joint comprising: an arcuate wedge shaped insert adherend to and extending along the inside length of a composite structural joint, a laminate of high modulus reinforced resin layers making up each of three sides of the wedge, a core of reinforced resin inside the layers of lamiantes, and a stitching of reinforcing threads joining the lamiantes together along the length and adjacent the core to make up the unified insert for the joint.

2. A composite structural joint as in claim 1 wherein each laminate making up the sides of the insert comprises a reinforcement of high modulus fibers, some of said fibers extending longitudinally and others extend normal to said first fibers and following the contours of the side of the wedge.

3. A composite structural joint as in claim 2 wherein the reinforcement in the core has fibers extending longitudinally.

4. A composite structural joint comprising: a laminate of high modulus fiber reinforced resin layers along each of three sides of an elongate wedge shaped having two arcuate sides, a reinforced resin filling up a core of the wedge, threads adjacent the core stitching together the laminates making up the arcuate sides, stitching together one of the arcuate sides and the third side and to stitching together the second arcuate side and the third side, the wedge acting as an insert adherend to a laminated skin and a pair of laminates making up a spar web for joining to the skin to form a joint of a composite structure.

5. A composite structural joint as in claim 4 wherein the threads are of aramid.

6. A composite structural joint as in claim 4 wherein the laminates making up the insert are of graphite fibers in an epoxy resin.

7. A composite structural joint as in claim 4 wherein the reinforced resin making up the core is of graphite fibers oriented to extend along the length of the core and set in epoxy resin.

8. A composite structural joint comprising: a laminate of longitudinally extending and of normal to longitudinal extending contour following graphite fibers in an epoxy resin to cover each side of a three sided wedge shaped having two arcuate sides, longitudinally extending graphite fibers in an epoxy resin to form a core inside the laminates, aramid fibers to stitch the laminates together adjacent the core to, in combination, make up an insert for and adherend to and part of a joint between two parts of a composite structure that are meeting at an angle essentially normal to each other.

* * * * *